Figure 1:
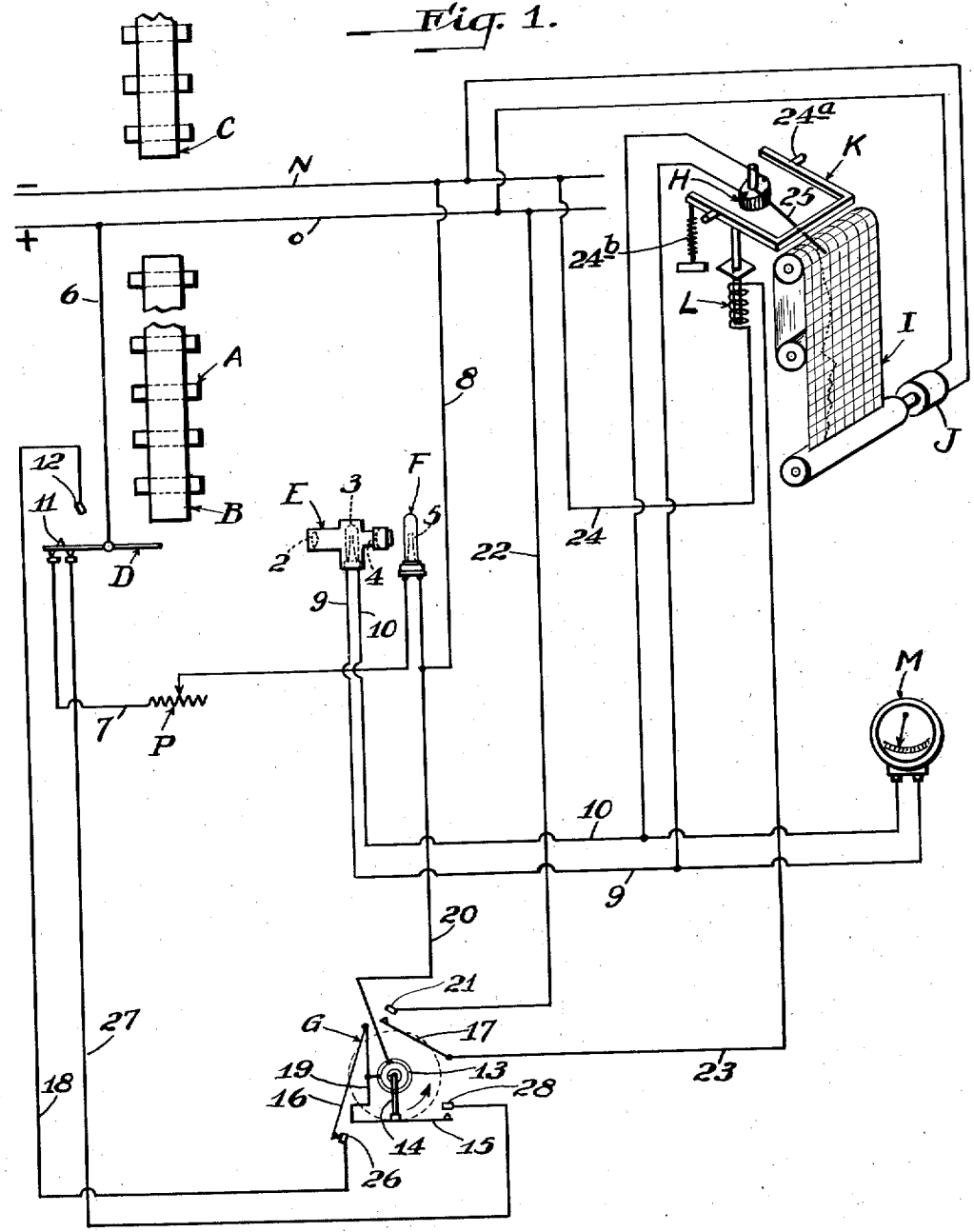

March 14, 1933. L. L. VAYDA 1,901,209
APPARATUS FOR MEASURING TEMPERATURES OF MOVING BODIES
Filed May 17, 1930 2 Sheets-Sheet 1

INVENTOR
Louis L. Vayda
by
James C. Bradley
Atty

March 14, 1933.                L. L. VAYDA                 1,901,209
           APPARATUS FOR MEASURING TEMPERATURES OF MOVING BODIES
                     Filed May 17, 1930         2 Sheets-Sheet 2
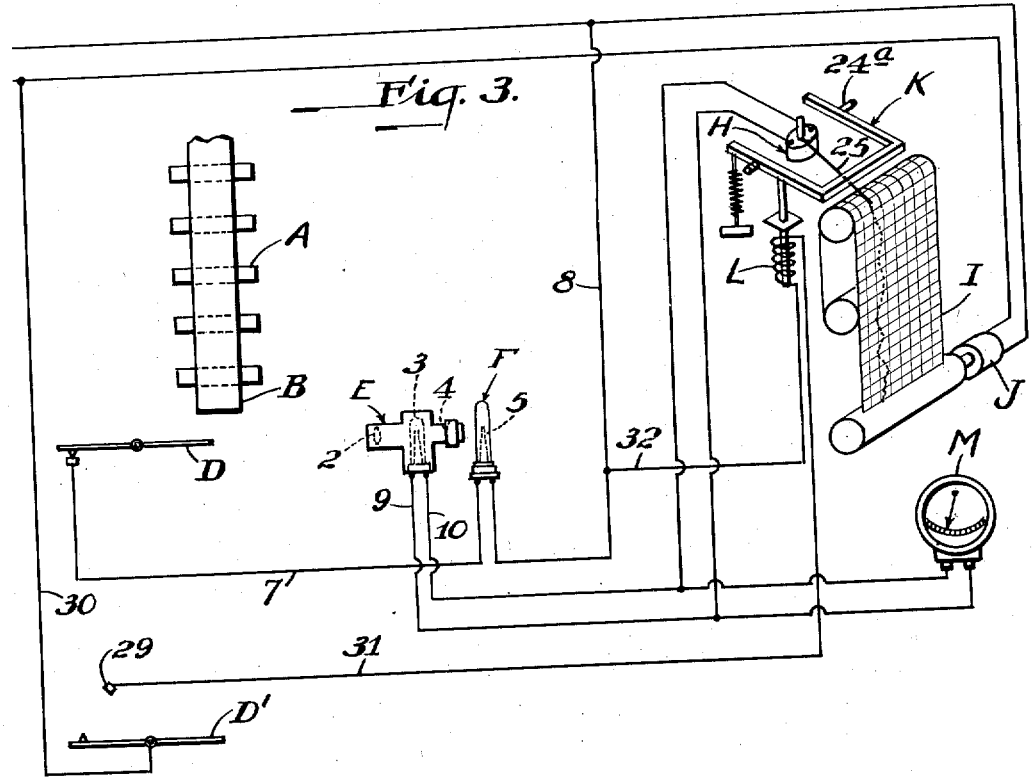
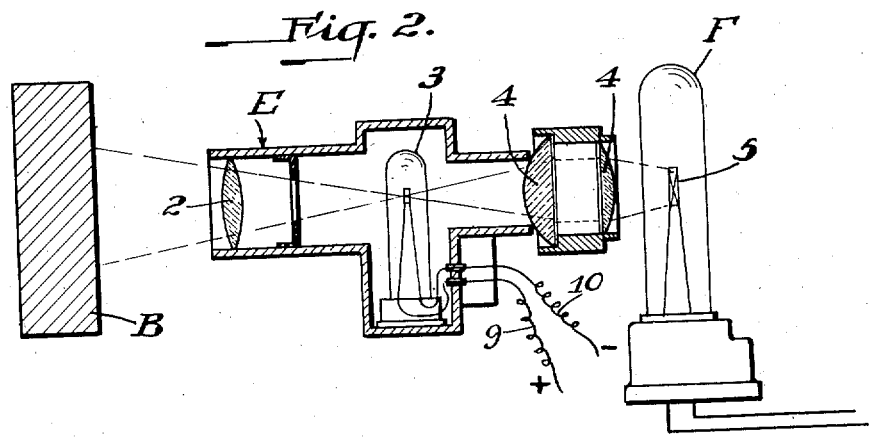
INVENTOR
Louis L. Vayda
by
James C. Bradley
att'y Patented Mar. 14, 1933

1,901,209

UNITED STATES PATENT OFFICE

LOUIS L. VAYDA, OF ASPINWALL, PENNSYLVANIA, ASSIGNOR TO BACHARACH INDUSTRIAL INSTRUMENT COMPANY, A CORPORATION OF PENNSYLVANIA

APPARATUS FOR MEASURING TEMPERATURES OF MOVING BODIES

Application filed May 17, 1930. Serial No. 453,206.

The invention relates to apparatus for measuring the temperature of moving bodies or materials and for recording such temperatures and also the number of bodies which pass the apparatus in a given time. The application constitutes in part a continuation of my application, Serial No. 340,374, filed February 16, 1929, being a modification of the apparatus illustrated and claimed in such application. As in said application, a radiation pyrometer is employed, past which the heated bodies, whose temperature is to be measured and recorded, move; and means are provided for creating in the pyrometer couple at intervals corresponding to the spaces between the bodies an electromotive force which approximates in its effect on the pyrometer, the effect of the heat radiations of one of the bodies, so that the oscillation of the galvanometer pointer or needle, which registers variations in the current from the pyrometer, is reduced and a more accurate record is secured than would otherwise be possible. One object accomplished by the present invention is the provision of an arrangement, which is more compact than that of said application, in that the entire apparatus lies on one side of the line of moving bodies, and hence is less in the way and less subject to interference with other apparatus. A further object accomplished is the provision of an apparatus which is less subject to error due to changes in condition in the plant where used, such as smoke or fog, as compared with the apparatus shown in said application. Certain embodiments of the invention are shown on the accompanying drawings, wherein:

Figure 1 is a diagrammatic plan view showing one embodiment of the invention. Fig. 2 is an enlarged vertical section through a part of the apparatus. And Fig. 3 is a diagrammatic plan view showing a modification.

Referring to Figs. 1 and 2, A is a driven roller conveyor for carrying along in series the moving bodies C, C, etc. whose temperature is to be recorded; D is a switch positioned so as to be actuated by the moving bodies; E is a radiation pyrometer arranged on one side of the conveyor A, so that its line of heat reception extends transversely of the line of movement of the heated bodies; F is an electric lamp also arranged in the line of heat reception of the pyrometer; G is a time switch, whose operation is controlled by the switch D; H is a galvanometer whose pointer or needle is controlled by a circuit including the micro-couple of the pyrometer; I is a chart arranged to move beneath the needle on the galvanometer pointer, which chart is moved continuously from the motor J; K is a depressor bar operated by the solenoid L and adapted to move the needle carried by the galvanometer pointer down into engagement with the chart at a definite interval (governed by the time switch) after the opening of the switch D by one of the moving bodies; M is a second galvanometer connected to the same circuit as the galvanometer H; N and O are the lines leading to a source of current supply and P is a rheostat for regulating the current supplied to the lamp F.

The pyrometer casing (Fig. 2) carries the focusing lens 2 at one end for bringing the heat rays from the moving bodies to a focus on the micro-couple 3 of the device. At the other end of the casing are a pair of plano-convex lenses 4, 4 for bringing the heat rays from the filament 5 of the lamp F to a focus on the micro-couple. As later explained, the switch control for the current supplied to the lamp is so arranged that current is supplied through the lamp filament only when the spaces between the heated bodies are opposite the end of the pyrometer casing carrying the lens 2.

When the parts are in the position shown, with the space between the heated bodies opposite the pyrometer, current is supplied through the lamp filament from the power lines N, O via the wire 6, switch D, wire 7 and wire 8, thus heating the filament and micro-couple and maintaining the circuit through the wires 9, 10 and the galvanometers H and M substantially constant despite the fact that none of the heated bodies are in position to act upon the micro-couple of the pyrometer.

When the heated body B is moved forward so that its end comes into alignment with the pyrometer, such end swings the switch D, so that its contact 11 engages the contact 12. This interrupts the circuit 7, 8 through the lamp filament and initiates the operation of the time switch G. This switch comprises a motor 13 having an arm 14 which is adapted to engage the three switch arms 15, 16 and 17. With the switch contact 11 an engagement with the contact 12, current flows through the motor 13 of the time switch via the wire 6, contacts 11, 12, wire 18, arm 16, wire 19, motor terminals, wire 20 and wire 8. The motor moves ahead (counter clockwise) until the arm 14 moves the arm 17 outward and into engagement with the contact 21, thus causing a flow of current through the winding of the solenoid L via the wire 22, arm 17, wire 23 and wire 24. This depresses the bar K, which is pivoted at 24a and held normally in raised position by a spring 24b, thus pressing the pointer 25 of the galvanometer down, so that its pen makes a dot upon the chart I. It will be observed that this actuation of the pen occurs at a definite interval after the actuation of switch D, so that the vibration or oscillation of the pointer has an opportunity to decrease before a record is made, thus insuring a more accurate record than would otherwise be the case.

The motor 13 continues to move on until the arm 14 engages the arm 16 and breaks the engagement between such arm and the contact 26, thus interrupting the circuit through the motor so that it stops.

When the heated body passes the switch D, such switch moves back to the position shown, thus completing again the circuit through the lamp filament via the wires 6, 7 and 8. The return of the switch D to the position shown, also completes a circuit through the motor of the time switch so that the motor moves on again. This circuit includes the wires 6, switch D, wire 27, contact 28, arm 15, wire 19, motor terminals, wire 20 and wire 8, and the motor moves on until the arm 14 engages the arm 15 and moves it away from the contact 28, at which time the motor stops, thus completing the cycle of operation. It will be noted that the device not only records the temperature of the heated bodies, but also gives a record of the number of such bodies which pass the switch D.

In the construction of Fig. 3, the time switch G is dispensed with, and a second switch D' is employed to secure the function accomplished by said time switch, namely, the securing of an interval between the actuation of the switch D and the operation of the depressor bar to record the reading of the pointer of the galvanometer. Parts in this apparatus similar in construction and operation to those of Fig. 1, are similarly numbered and lettered and require no further description. When the switch D is opened by the body B, the circuit through the lamp F is interrupted, but no record of the position of the pointer of the galvanometer H is made until the body reaches the switch D'. When this switch is moved so that its end engages the contact 29, a circuit is completed through the winding of the solenoid L, such circuit including the wire 30, switch D' and wires 31, 32 and 8. This causes the downward movement of the depressor bar K and pointer 25, thus making a record on the chart I. When the rear end of the body passes the switch D, it moves to closed position again thus completing the circuit through the lamp F. The pen on the pointer remains in contact with the chart until the rear end of the body moves past the switch D'.

What I claim is:

1. In combination in apparatus for measuring the temperatures of a series of heated bodies, which are moved along in spaced relation on a conveyor, a thermo-electric radiation pyrometer adjacent the conveyor with its line of heat reception extending transversely thereof, an electric lamp positioned so that the heat therefrom will act upon the pyrometer, a source of current supply for the lamp including a circuit, switch devices operated by the moving bodies for making and breaking said circuit, a galvanometer in the circuit of the pyrometer element having a recording pointer or arm, a chart arranged to move past the pointer, and electro-magnetic means controlled by said switch devices for moving the pointer into contact with the chart.

2. In combination in apparatus for measuring the temperatures of a series of heated bodies, which are moved along in spaced relation on a conveyor, a thermo-electric radiation pyrometer adjacent the conveyor with its line of heat reception extending transversely thereof, an electric lamp positioned so that the heat therefrom will act upon the pyrometer, a source of current supply for the lamp including a circuit, switch devices operated by the moving bodies for making and breaking said circuit, a galvanometer in the circuit of the pyrometer, electro-magnetic means controlled by said switch devices for moving the pointer into contact with a chart, and a time switch interposed between said switch devices and the electro-magnetic means for giving a pause between the actuation of the switch devices by the moving bodies and the actuation of the pointer by the electro-magnetic means.

3. In combination in apparatus for measuring the temperatures of a series of heated bodies, which are moved along in spaced relation on a conveyor, a thermo-electric radiation pyrometer adjacent the conveyor with its line of heat reception extending transversely thereof, an electric lamp positioned so that the heat therefrom will act upon the pyrometer, a source of current supply for the lamp including a circuit, switch devices operated by the moving bodies for making and breaking said circuit, a galvanometer in the circuit of the pyrometer element having a recording pointer or arm, a chart arranged to move past the pointer, and electro-magnetic means controlled by the switch devices and arranged so as to move the pointer into contact with the chart after a definite period of delay following the interruption of said circuit.

4. In a thermo-electric radiation pyrometer, a source of heat adapted to maintain the thermocouple in a controlled degree of activity, said source of heat located on the side of the thermocouple opposite that acted upon by heat from the body to be measured, and means for rendering said source of heat inactive during the time of passage of an article to be measured through the focus of said pyrometer.

In testimony whereof, I have hereunto subscribed my name this 15th day of May, 1930.

LOUIS L. VAYDA.